(12) United States Patent
Windmöller

(10) Patent No.: US 8,728,603 B2
(45) Date of Patent: *May 20, 2014

(54) FLOOR PANEL

(75) Inventor: Ulrich Windmöller, Schloss Holte-Stuckenbrock (DE)

(73) Assignee: Ulrich Windmöller Consulting GmbH, Schloss Holte-Stuckenbrock (DE)

( * ) Notice: Subject to any disclaimer, the term of this patent is extended or adjusted under 35 U.S.C. 154(b) by 383 days.

This patent is subject to a terminal disclaimer.

(21) Appl. No.: 13/214,175

(22) Filed: Aug. 20, 2011

(65) Prior Publication Data

US 2011/0296780 A1 Dec. 8, 2011

Related U.S. Application Data

(63) Continuation-in-part of application No. 11/953,131, filed on Dec. 10, 2007, now Pat. No. 8,071,193.

(30) Foreign Application Priority Data

Dec. 11, 2006 (DE) .......................... 10 2006 058 655

(51) Int. Cl.
*E01B 5/00* (2006.01)
*B32B 38/14* (2006.01)

(52) U.S. Cl.
USPC ........ 428/60; 52/506.01; 52/592.1; 52/592.4; 156/182; 428/58

(58) Field of Classification Search
USPC .............. 52/506.01, 592.1, 592.4; 428/58, 60
See application file for complete search history.

(56) References Cited

U.S. PATENT DOCUMENTS

| | | | |
|---|---|---|---|
| 6,345,481 B1 * | 2/2002 | Nelson | 52/592.2 |
| 6,991,830 B1 | 1/2006 | Hansson et al. | |
| 8,071,193 B2 * | 12/2011 | Windmoller | 428/60 |
| 2003/0233809 A1 | 12/2003 | Pervan | |
| 2004/0003888 A1 * | 1/2004 | Mott et al. | 156/269 |
| 2004/0255538 A1 * | 12/2004 | Ruhdorfer | 52/506.01 |
| 2005/0281986 A1 | 12/2005 | Nam | |
| 2007/0175137 A1 | 8/2007 | Stone et al. | |
| 2013/0104486 A1 * | 5/2013 | Windmoller | 52/588.1 |

FOREIGN PATENT DOCUMENTS

| | | |
|---|---|---|
| DE | 19944399 A1 | 4/2001 |
| DE | 20214532 U1 | 3/2004 |
| DE | 10316886 A1 | 10/2004 |
| DE | 202004014160 U1 | 12/2004 |
| DE | 102004011531 B3 | 11/2005 |
| DE | 102005023661 A1 | 11/2006 |
| EP | 698126 | 2/1996 |
| EP | 0843763 B1 | 5/1998 |
| EP | 1024234 A2 | 8/2000 |
| EP | 1036341 B1 | 9/2000 |
| EP | 12626607 A1 | 5/2001 |
| GB | 1430423 | 3/1976 |
| WO | 94/28183 A1 | 12/1994 |

* cited by examiner

*Primary Examiner* — Brent O'Hern
(74) *Attorney, Agent, or Firm* — Richard M. Goldberg

(57) ABSTRACT

A floor panel in the form of a multilayer, rectangular laminate with a soft core (10) of plastic, a décor film (12) on the upper side of the core (10), a transparent finishing layer (14) and a transparent lacquer layer (16) applied on the finishing layer (16), as well as a back-pull layer (18) on the back of the core (10), with a lockable tongue and groove connection at least at two mutually opposite edges of the panel (20, 22).

9 Claims, 7 Drawing Sheets

FLOOR PANEL

BACKGROUND OF THE INVENTION

The invention relates to a floor panel in the form of rectangular plastic plate, as well as to a method for manufacturing such a floor panel.

A floor panel in the form of a rectangular plastic plate with tongue and groove profiling at least at two mutually opposite edges is known from the British patent 1,430,423. In comparison to a conventional tongue and groove connection, the tongue and groove profiling used has the special feature that the tongue and groove can be locked to one another so that adjacent plates can be prevented from drifting apart in the plane in which they are laid. In the present context, a connection of this type is to be referred to as a lockable tongue and groove connection.

Recently, tongue and groove connections have been employed widely in the course of the success of the so-called laminated floor panels. In practice, because of the possibility of locking adjacent panels together in a springy fashion, click connections are also mentioned in practice. The known, relevant patents include the EP 843,763 A1, the EP 1,024,234 A1, the EP 1,036,341 A1 and the EP 698,126 A1.

The known floor panels generally consist of a chipboard core (such as an MDF or an HDF core), which is covered (laminated) with a décor layer and a use surface or a finishing layer.

Laminated floors have proven to be optically appealing, advantageously priced, relatively light and flooring material, which can also be laid by lay persons. Furthermore, they are correspondingly widely spread.

Because of the high proportion of wood material in the laminated panels, it has not been possible until now to appreciably reduce the relatively high impact noise, which emanates from laminated floors.

On the other hand, plastic floor coverings are also known, which generally consist predominantly or completely of PVC and are supplied in the form of individual tiles or panels. These individual tiles or panels are glued to a solid substrate. Admittedly, these plastic floor coverings have advantages in relation to the transfer of impact noise. However, laying the individual panels by gluing them to the substrate continues to be time-consuming and labor intensive. Since dispersion adhesives are generally used for this purpose, bubbles may be formed in the floor covering because of the diffusion of vapors through the adhesive layer or also due to moisture from the substrate.

SUMMARY OF THE INVENTION

It is therefore an object of the invention, to create a floor panel of the type mentioned above, which, while retaining the advantageous impact noise properties, can be laid rapidly, simply and without problems.

This objective is accomplished by means of a wall or floor panel with the distinguishing features of claim 1.

An inventive floor panel is in the form of a multilayer rectangular laminate, which has a soft core of plastic, especially of PVC, on the upper side of which there is a décor film. A transparent finishing layer and, on the latter, a transparent lacquer layer are applied on the décor film. On the back of the panel, there is a counteracting layer. At least two mutually opposite edges are provided with a lockable tongue and groove profile.

The inventive floor panels can be laid in the same way as conventional floor panels of MDF and HDF. Because of its relatively soft core of plastic, especially of PVC or polyurethane, the material has a high degree of impact noise dampening.

An inventive floor panel is completely water-resistant and can therefore also be used for rooms, which are exposed to water and other liquids and moisture. The material does not swell after it comes into contact with a liquid.

A particularly high increase in impact noise damping can be achieved by affixing an impact noise mat to the back of the panels.

At the present time, PVC comes into consideration first of all as a material for the core and the various other layers of the inventive panel. However, the use of other plastics, such as polyurethane and polyolefin, would also be possible.

The individual layers are connected to one another by a hot laminating process. Only the UV-cured lacquer layer is applied subsequently in a separate step.

The inventive panel should be thicker than the conventional elastic floor panels. The thickness should be 4 to 8 mm. The weight should be 1.5 to 2.0 kg per mm and per $m^2$.

Connecting panels with a lockable tongue and groove profile have the advantage that an area can be laid so as to float. Moisture below the floor can be diverted to the side.

It is particularly significant that it is not necessary to glue the panels. The previously customary gluing was always associated with much contamination of the material and of the premises as well as of the personnel. It takes some time for the adhesive to dry. The evaporation during the drying generally is perceived as unpleasant. These disadvantages do not arise in the case of the inventive laying system without gluing.

After the panels are laid, the floor can be used immediately. In the case of renovations, downtimes are reduced appreciably.

PVC raw material has the negative property that, during the aging process, there is migration of the plasticizer and, with that, shrinkage. In the case of conventional, glued connections, this can lead to the formation of gaps. Since the inventive floor can be laid so as to float, any shrinkage occurring can be compensated for by the floating arrangement and the locking of the panels.

Just like previous laminated floors, an inventive floor can be taken up and used once again, making it suitable for exhibitions and stores, for presentation areas in sales spaces, in furniture stores, etc.

The inventive floor panels can be produced especially in different dimensions of conventional floor panels, for example, in sizes staggered by 10 cm from 30×30 cm to 60×60 cm. They can also be offered in strip formations ranging in length from 90 to 120 cm and in width from 7 to 22 cm.

The inventive floor panels accordingly correspond in structure essentially to the conventional laminates with an HDF or MDF core. However, they consist entirely of plastic. A plastic laminate of this type has a series of positive properties, which clearly make up for the possibly somewhat higher price, especially for certain purposes.

BRIEF DESCRIPTION OF THE DRAWINGS

In the following, preferred examples are explained in greater detail by means of the attached drawings, in which.

DETAILED DESCRIPTION

Figure 1:
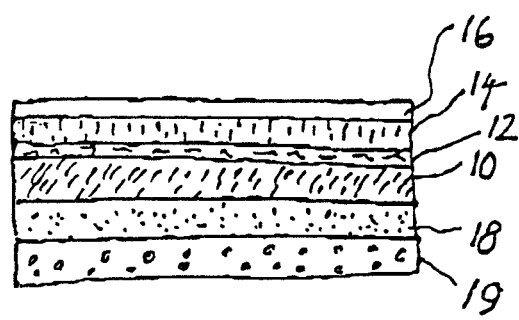
FIG. 1 shows a diagrammatic, partial section to illustrate the inner construction of the inventive floor panel.

To begin with, reference is made to FIG. 1. The center of the inventive floor panel is a core 10 of a relatively highly filled, but still elastic plastic, especially PVC or polyurethane. On the core, there is a décor layer 12, such as a printed PVC film, which may be a décor of any type, for example a wood décor or also a stone décor and also any décor imaginable. The décor layer 12 is covered by a use surface or a finishing layer 14, which has a high abrasion resistance. Finally, there is a UV curable layer 16 on the surface. Curing by UV light has the particular advantage that the manufacturing process is accelerated. On the back of the panel, there is a counteracting layer, which prevents curvature of the panel during expansion and shrinkage.

At the underside of the panel, a damping layer 19 may be provided, which additionally contributes to damping the sound of steps and/or of room noise. The layer 18 of FIG. 1 may, in addition, carry out the function of a back pull and, at the same time, be a damping layer. It is, however, possible to divide the functions of a back pull layer and of a damping layer and have them carried out by two separate layers. The damping layer may be a foam layer, for example, of polyurethane. Fillers, especially mineral fillers, such as sand, chalk or the like may be present in the damping layer. These fillers increase weight and, with that, contribute to the damping. There may also be suitable fillers in the core 10.

FIG. 2 shows different examples of the edge profile, which is to be used and enables adjacent panels to be locked.

Figure 2A:
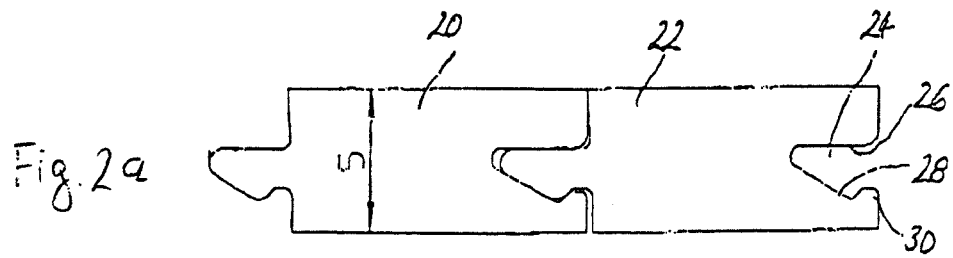
FIGS. 2a-2e show different diagrammatic partial sectional representations to explain lockable edge profiles, which can be used pursuant to the invention.

FIG. 2a shows two adjacent tiles 20-22 with a lockable tongue and groove connection. At the right side of the panel in FIG. 2a, the groove 24 has a straight flank 26, which extends parallel to the plane of the panel. The other flank 28 approaches the opposite flank 26 in the direction of the depth of the groove 24 and, at its open end, has a protrusion 30, which is directed inward in the direction of the opposite flank 26. Accordingly, this type of tongue and groove connection is partly undercut. However, it may be pressed together with a click effect, particularly since the material, as a whole, is relatively elastic and therefore deforms adequately, when two panels are to be connected with one another. The profile of FIG. 2a is a typical locking profile.

Figure 2B:
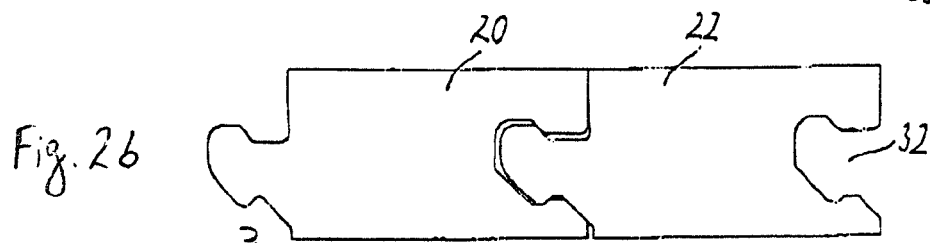
Figure 2C:
Figure 2D:
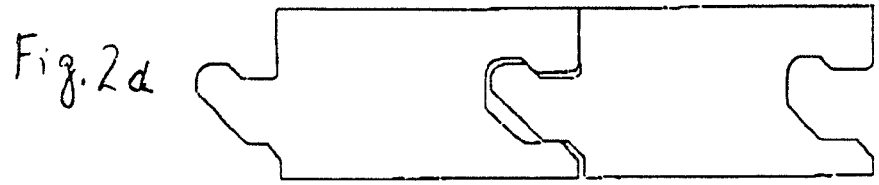

The embodiments of FIGS. 2b, 2c and 2d are similar to one another. Once again, they have a slightly undercut groove 32, which, on the whole, has a direction, rising into the interior of the material of the panels 20, 22, as well as an expanded head region at the base of the groove. Tongue and groove connections of this type can be caused to "interact" with one another, when two panels are to be connected with one another. In the case of profiles of this type, it is customary to speak of "single angle profiles". To begin with, a new panel, which is to be added, is bent slightly and, after the tongue, which is not labeled, is pressed into the groove of the new panel, lowered into the flat position. In this way, adjacent panels, overcoming the undercuts of the tongue and groove connections, can be installed relatively easily and with little expenditure of force.

Figure 2E:
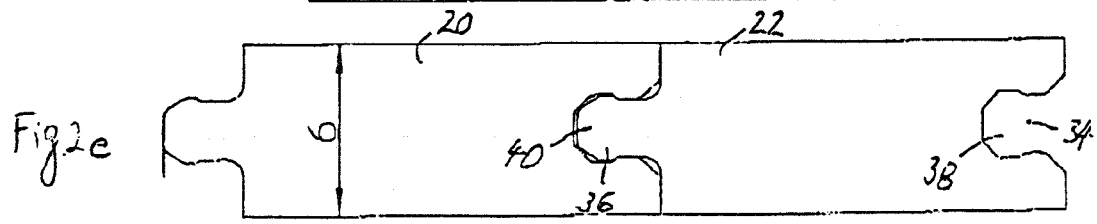

FIG. 2e shows a further locking profile, namely, an embodiment with a groove 34 and a tongue 36, which are close to one another in a tongue and groove connection, but have an expanded head region 38, 40. In view of the expansion of the head region, adjacent panels must be assembled with a certain pressure. The elastic material of the panels permits the tongues to be locked easily in the grooves.

In the following further embodiments of the present invention are described with reference to FIGS. 3 to 7.

Figure 3:
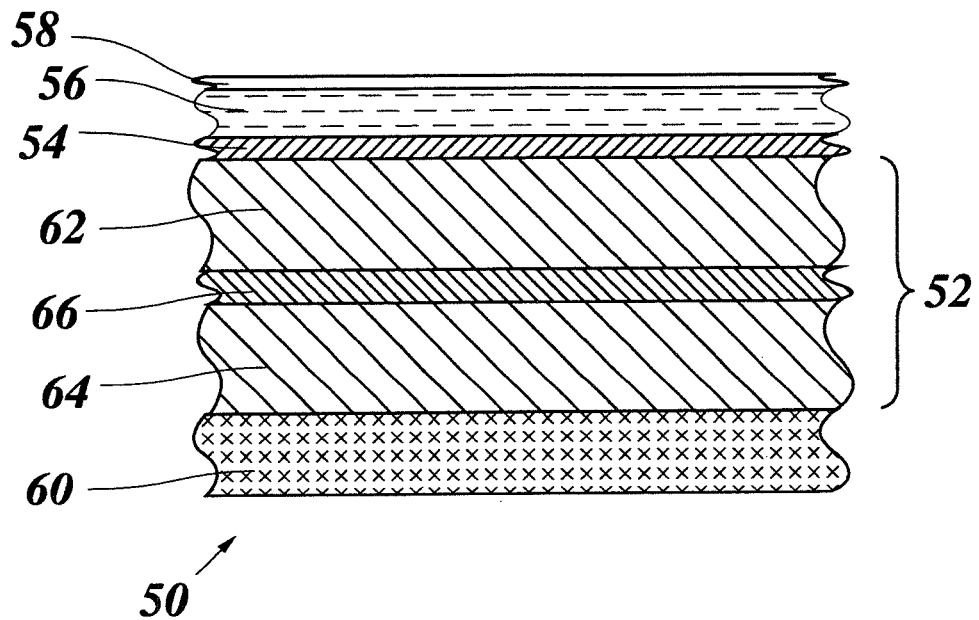
FIGS. 3, 4 and 5 show diagrammatic, partial sections of different embodiments of the inventive floor panel.

FIG. 3 is a cross section through a floor panel 50 according to a second embodiment of the present invention. As the floor panel described with reference to FIG. 1, this floor panel 50 comprises a core 52 of elastic plastic which is deformable. This means that the core 52 can be deformed, for example, by bending but has the tendency to return to its original shape. An important difference between the core 10 shown in FIG. 1 and the core 52 of the floor panel 50 in FIG. 3 is that the core 52 has an inner laminate structure, which will be described in more detail in the following.

On top of the core 52, there is a decor film 54 that is made of Polyvinylchloride (PVC) material which is printed with a decor of any type, for example a wood decor or a stone decor. The decor film 54 is covered by a finishing layer 56 which has a high abrasion resistance. The finishing layer 56 is also made of a thermoplastic plastic like Polyvinylchloride (PVC). Although not shown in FIG. 3, the transparent finishing layer 56 has a haptic structure onto its upper surface that is imprinted by rolling. Finally, there is a UV curable transparent lacquer layer 58 applied on top of the finishing layer 56. On the back (bottom side) of the panel 50, there is a back-pull layer 60 which prevents a curvature of the panel during expansion or shrinkage. This back-pull layer 60 simultaneously acts as a sound damping layer. It is made of a recycled PVC material with fillers therein, especially mineral fillers, such a sand, chalk or the like. The fillers increase the weight and contribute to the sound damping properties.

The core 52 comprises an upper core layer 62 and a lower core layer 64 disposed under the upper core layer 62. Both the upper core layer 62 and the lower core layer 64 are made of a soft Polyvinylchloride (PVC) material. This material can also comprise fillers, like the mineral fillers comprised within the back-pull layer 60. However, this may not necessarily be the case. Between the upper core layer 62 and the lower core layer 64 there is provided a reinforcement layer 66 which is a glass fiber mat that is impregnated with a soft Polyvinylchloride (PVC) material. This reinforcement layer has the function to provide a dimensional stability to the core, to prevent an excessive shrinkage or expansion of the floor panel 50 due to a change of temperature. The reinforcement layer 66 has a high thermal stability, i.e. it hardly changes its dimensions in case of a thermal variation, especially in the horizontal direction parallel to the core layers 62 and 64. That is, the overall dimensional stability of the floor panel 50 is high even when the core layers 62 and 64 or other layers of the floor panel 50 have the tendency to shrink or to expand due to a rise or fall of the ground temperature or room temperature. The present inventors have found that the provision of the reinforcement layer 66 can reduce a thermal shrinkage or expansion of the floor panel 50 by up to 50%.

Another important advantage of providing a reinforcement layer 66 to the core 52 is to improve the stability of the floor panel 50 against local pressure by a sharp object, for example, a piece of furniture. This is due to the fact that the dense fabric of the glass fiber mat that forms the reinforcement layer 66 provides a strong resistance to a local pressure by a sharp or pointed heavy object resting on top of the floor panel 50. Even if the top layers resting on the reinforcement layer 66, especially at least one of the upper core layer 62 and the decor film 54, are compressed punctually to some extent, this local compression will not cause a deterioration or even a lasting damage of the overall structure of the floor panel 50 because of the resistance of the reinforcement layer 66. However, the glass fiber mat can still be bent so as to keep the elastic properties of the floor panel 50 in a larger scale.

The laminate structure of the floor panel 50 in FIG. 3 comprises different layers of plastic materials but no wooden materials at all. It has excellent sound dampening properties, not only because of the structure of the back-pull layer 60. The remaining layers, especially the structure of the core 52, contribute to the sound dampening function, so that the floor panel 50 has such has an excellent quality under this aspect. Moreover, the whole floor panel 50 is elastic so that it can be bent and deformed but returns to its original flat shape when it is laid down on the floor in the installation process. No adhesive is necessary to install it.

Another important advantage of the present floor panel 50 is that it can be cut with a sharp strong knife. No saw is necessary to cut the floor panel 50 into pieces, because it only comprises layers of plastic materials. This makes the installation process very easy even for inexperienced persons. In most cases even cutting at the surface of the floor panel 50 is sufficient to create a weakening line at the upper surface of the floor panel 50 so that it can be broken afterwards.

While the PVC material portion of the back-pull layer 60 can be a recycling material, the upper layers of the floor panel 50 may consist of non recycling materials to avoid harmful gaseous emissions from the floor.

The floor panel 50 of FIG. 3 is manufactured in a process as followed. First of all, the layers 54,56,62,64 and 60 are extruded. This means that the upper core layer 62 and the lower core layer 64 are extruded from a soft Polyvinylchloride (PVC) material, and the decor film 54 is extruded of a Polyvinylchloride (PVC) material as well as the transparent finishing layer 56. The back-pull layer 60 is extruded from a PVC material including sound dampening fillers like mineral fillers including chalk, sand or the like.

The reinforcement layer 66 is created by providing a glass fiber mat and impregnating the glass fiber mat with a soft Polyvinylchloride (PVC) material. This can be performed by immersing the glass fiber mat into liquid PVC.

The decor film 54 is printed with a decor after the extrusion process. The lamination structure of the floor panel 50 in FIG. 3 is created by applying the layers 54,56,60,62,64,66 onto each other, including the application of the reinforcement layer 66 between the upper core layer 62 and the lower core layer 64 so that the reinforcement layer 66 is sandwiched between these two layers 62,64 to form the core 52. The core 52, the decor film 54, the transparent finishing layer 56 and the back-pull layer 60 are bonded together by a calendering process under an elevated temperature, including the application of pressure and heat to the laminate structure. This leads to a compact laminate structure with a relatively high weight but with a high elasticity and excellent sound dampening properties. The reinforcement layer 66 in the center of the core 52 improves the dimensional stability of the resulting floor panel 50 and makes it highly resistant against local pressure.

Finally a haptic structure can be imprinted onto the surface of the transparent finishing layer to imitate a wood structure. This imprinting process can be performed by rolling under heat and pressure to deform the surface of the transparent finishing layer 56. Structures resulting from this imprinting process are relatively deep, compared to the overall thickness of the floor panel 50. A transparent lacquer layer 58 is applied onto the transparent finishing layer 56, which is an UV curable lacquer layer.

It is noted that the individual extrusion processes for forming the core layers 62,64, the decor film 54, the transparent finishing layer 56 and the back-pull layer 60 can be performed at the same time, as well as the process step of forming the reinforcement layer 66. Moreover, it is possible to apply all layers including the core 52, the decor film 54, the transparent finishing layer 56 and the back-pull layer 60 at the same time and to perform the calendering process afterwards, or to apply one layer after the other and to perform the calendering process afterwards.

Figure 4:
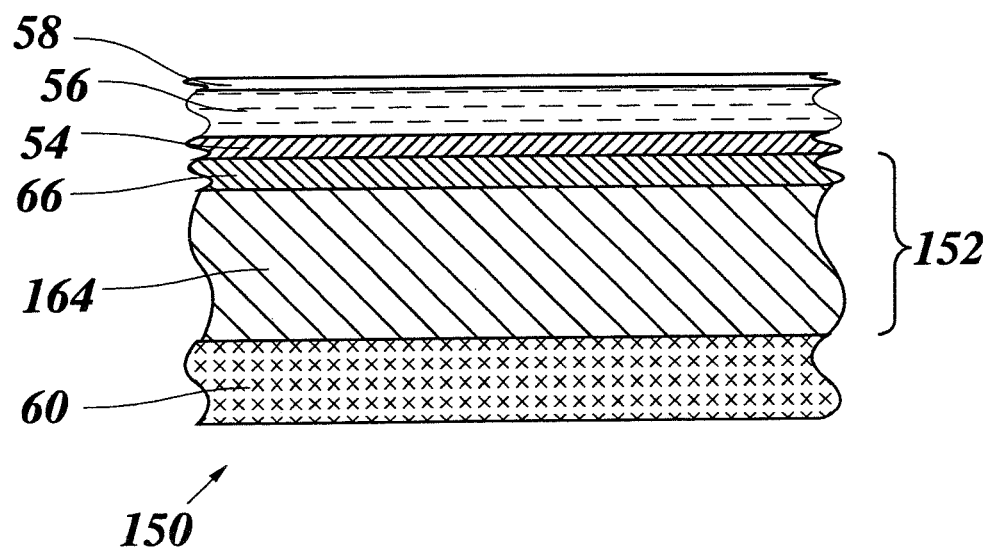

FIG. 4 shows a different embodiment of a floor panel 150, shown in a cross section. Some of the layers of the floor panel 150 are the same as those of the floor panel 50 in FIG. 3, and so they are denoted with identical reference numbers. This stands for the back-pull layer 60, the decor film 54, the transparent finishing layer 56 and the lacquer layer 58. The floor panel 150 is also provided with a core 152 that has a structure different than the core 52 in FIG. 3. The core 152 comprises only one core layer 164 of soft Polyvinylchloride (PVC) material. On this core layer 164, the reinforcement layer 66 is provided. The structure of the reinforcement layer 66 as such is the same as described in connection with the floor panel 50, i.e. the reinforcement layer 66 comprises a glass fiber mat that is impregnated with a soft Polyvinylchloride (PVC) material. On top of the core 152 formed by the single core layer 164 and the reinforcement layer 66, the decor film 54 is provided. That is, an upper core layer between the reinforcement layer 66 and the decor film 54 is omitted in the floor panel 150 in FIG. 4.

The manufacturing process of the floor panel 150 is mainly the same as with the floor panel 50, including the extrusion of the different layers 54,56,60,164 of plastic material, providing the reinforcement layer 66, applying all layers 54,56,60, 164,66 together and bonding them together in a calendering process. Afterwards the lacquer layer 58 can be applied.

Figure 5:
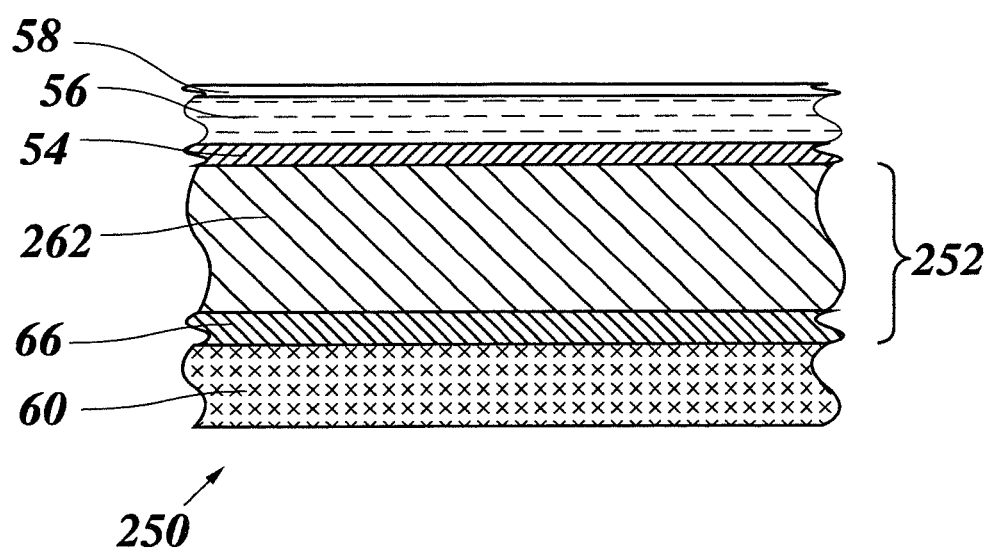

One more embodiment of a floor panel 250 is shown in FIG. 5, including a core 252 that also comprises one single core layer 262 of soft Polyvinylchloride (PVC) material and a reinforcement layer 66. The difference to the floor panel 150 described before in connection with FIG. 4 lies in the arrangement of the reinforcement layer 66, that is disposed beneath the single core layer 262 on top of the back-pull layer 60.

Figure 6:
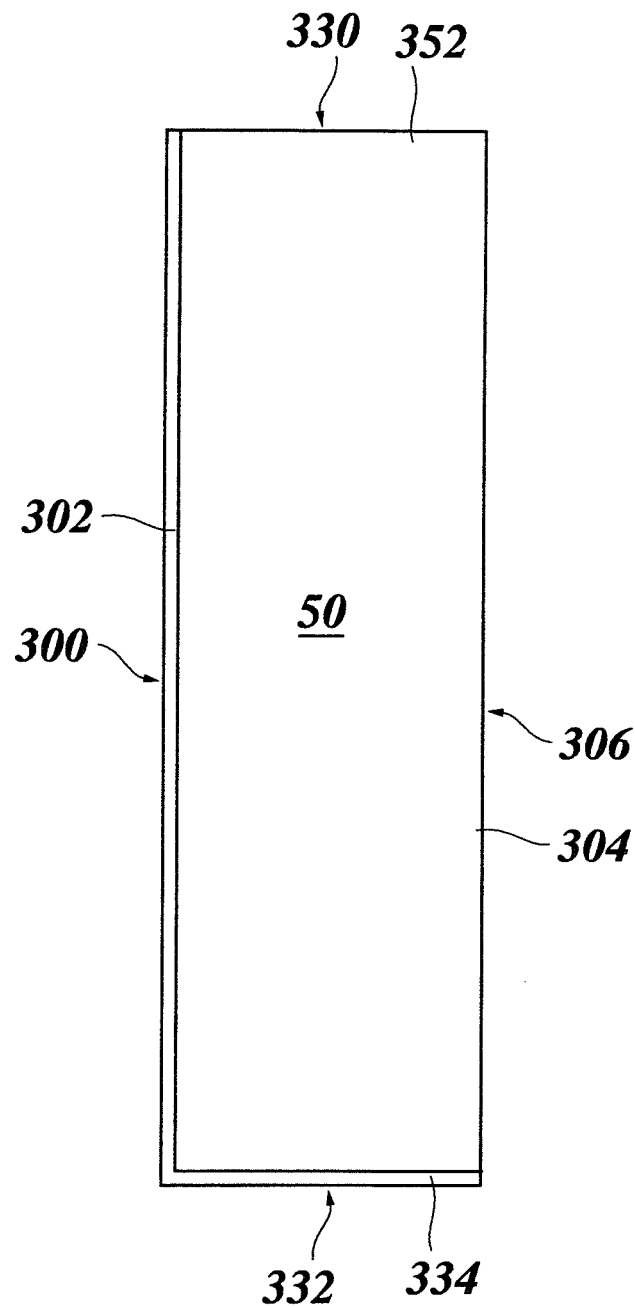
FIG. 6 is a plan view of an inventive floor panel.

FIG. 6 is plan view on a floor panel 50 according to the second embodiment of the present invention. It can be taken from FIG. 6 that the floor panel 50 has a rectangular shape. At its edges, floor panel 50 is provided with tongues and grooves for connected adjacent floor panels 50 with each other. In the following the longer edges of the floor panel 50 will be denoted as longitudinal edges, while the shorter edges will be referred to as traverse edges. At a first longitudinal edge 300 of the floor panel 50 (left longitudinal edge 300), there is provided a first groove 302 for receiving a first tongue with a complementary cross section. Such a first tongue 304 is provided at the opposite (second) longitudinal edge 306. This means that the floor panel 50 can be connected with another identical floor panel 50 on the left side in FIG. 6 by inserting the tongue 304 of this additional floor panel (not shown) into the groove 302 of the floor panel 50 in FIG. 6. In the same way, the tongue 304 of the floor panel 50 in FIG. 6 can be inserted into a groove 302 of an adjacent floor panel (not shown) on the right side. Further details of the respective cross section of the tongue 304 and the groove 302 will be explained with respect to FIGS. 7 and 8.

Figure 7:
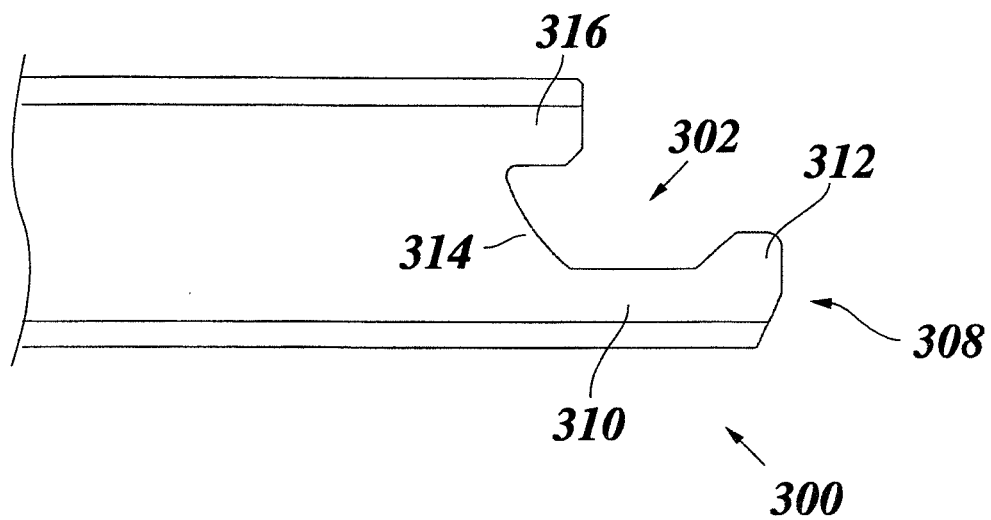
FIGS. 7 to 10 are diagrammatic partial sections of different edge portions of the floor panel of FIG. 6.

According to FIG. 7, a protrusion 308 with a hook-like cross section is provided at the lower portion of the first longitudinal edge 300 of the panel 50. This protrusion 308 comprises a flat intermediate section 310 and a head 312 that forms the end of the protrusion 308. The head 312 has a thicker cross section in the vertical direction, compared to the intermediate section 310, so that the upper surface of the head 312 is slightly elevated over the top surface of the intermediate section 310. In this way the upper portion of the head 312 delimits a through-shaped groove 302 on top of the protrusion 308. On the side of the body of the floor panel 50, the groove 302 is delimited by a wall 314 with a concave arc-shaped cross section.

At the top of the wall 314, there is a second protrusion 316 protruding from the upper portion of the first longitudinal edge 300 of the panel 50, extending slightly over the groove 302 and closing it partially on its top side. This second protrusion 316 at the upper portion of the edge 300 of the panel 50 has the function to prevent a tongue 304 lying within the through-shaped groove 302 from being lifted out of the groove 302 in the vertical direction.

Figure 8:
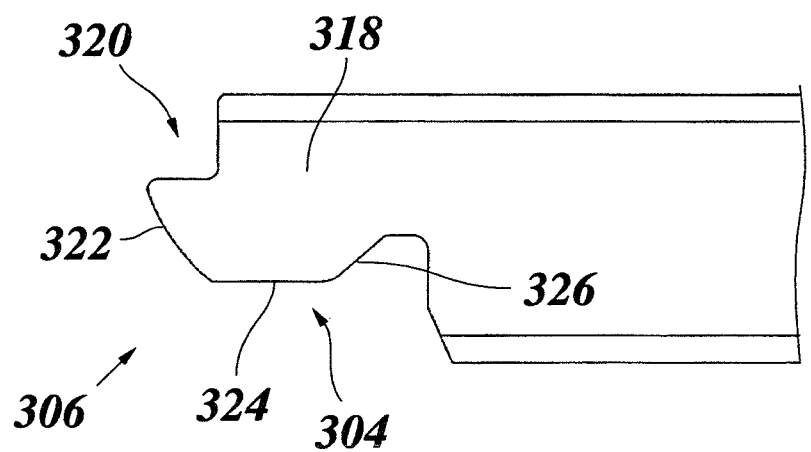

The tongue 304 at the opposite longitudinal edge 306 is shown in FIG. 8. It is formed at the bottom of a protrusion 318 protruding from the upper portion of the second longitudinal edge 306 of the panel 50. The tongue 304 itself extends slightly further than the protrusion 318 so that there is a step 320 on the top side of the longitudinal edge 306. At its bottom, the tongue 304 has an inclined arc-shaped wall 322 to be fitted onto the inner wall 314 of the groove 302 in FIG. 7. Moreover the tongue 304 has a flat bottom 324 and an arc-shaped wall 326 at its bottom side facing the body of the floor panel 50.

The tongue 304 of FIG. 8 is inserted into the groove 302 in FIG. 7 by inclining the floor panel 50 carrying the tongue 304 upwards so that the tongue 304 can be placed on top of the protrusion 308 of the other floor panel 50. In a position in which the outer wall 322 of the tongue 304 contacts the wall 314 of the groove 302, the floor panel 50 carrying the tongue 304 can be laid down on the floor so that both floor panels 50 to be connected lie in the same plane. In this position the bottom 324 of the tongue 304 rests on the ground of the groove 302, i.e. on top of the intermediate section 310 of the protrusion 308. In this mounting position, it is not possible to separate the floor panels 50 by pulling the floor panels 50 in opposite directions or by simply lifting the tongue 304 out of the groove 302 in a vertical direction. Like in the installation process described above, both floor panels 50 can only be separated in a combined turning and lifting movement, turning the tongue 304 out of the groove 302 and taking it out.

Figure 9:
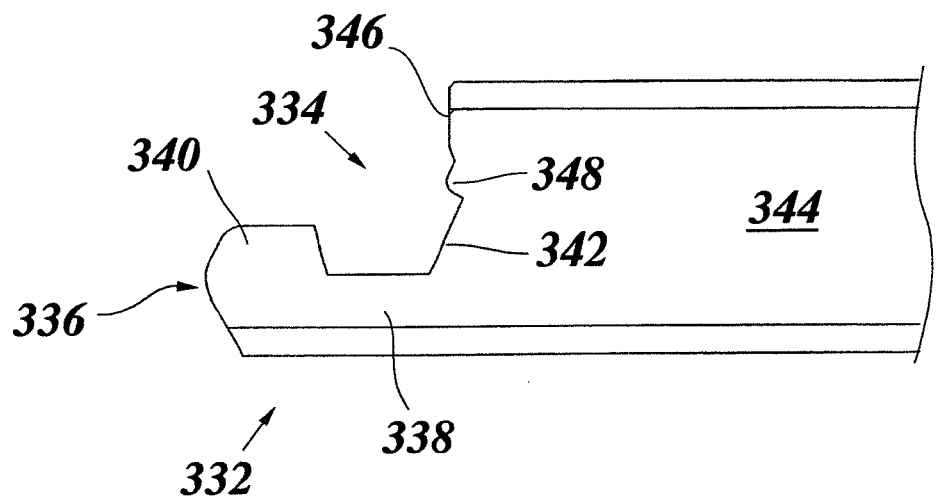

Back to FIG. 6, different tongues and grooves than described before with respect to FIGS. 7 and 8 are provided at the traverse edges 330 and 332 of the floor panel. They will be described with reference to FIGS. 9 and 10. At the first traverse edge 332 in the lower part of FIG. 6, a second groove 334 is provided on top of a protrusion 336 with a hook-like cross section that extends from the lower portion of the first traverse edge 332 in a horizontal direction. Like the protrusion 308 at the longitudinal edge 300, the protrusion 336 extends along the whole length of the traverse edge 332 and comprises an intermediate portion 338 with a cross section of uniform height. The end of the protrusion 336 is formed by an extended head portion 340 with a thickness greater than that of the intermediate portion 338, so that the upper surface of the protrusion 336 has a step-like configuration, with a through-shaped groove 334 formed therein. The bottom of this groove 334 is formed by the upper surface of the intermediate portion 338, and the groove 334 is laterally delimited by the head portion 340 and an inclined wall 342 disposed at the body 344 of the floor panel 50. Generally the groove 334 has a cross section of a trapezoidal shape.

At the upper portion of the first traverse edge 332, the panel body 344 is delimited by a vertical wall portion 346. The inclined wall portion 342 and the vertical wall portion 346 are separated by a horizontal ridge 348 extending towards the protrusion 336.

Figure 10:
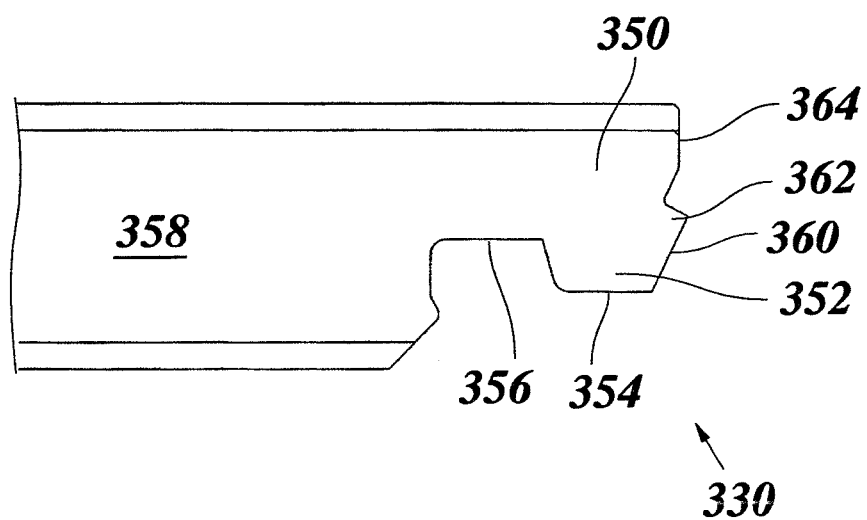

According to FIG. 10, the second traverse edge 330 is provided with a protrusion 350 extending from the upper portion of this traverse edge 330 in a horizontal direction. At the bottom of this protrusion 350, a second tongue 352 is provided that has a generally trapezoidal cross section that corresponds to that of the second groove 334 of FIG. 9. Because of the presence of the tongue 352, the bottom surface of the protrusion 350 has a step-like configuration formed by the bottom 354 of the tongue 352 and an elevated bottom portion 356 that is located nearer to the body 358 of the floor panel 50 than the tongue 352. At its side facing away from the body 358, the tongue 352 is limited by an inclined wall 360 that forms a ridge 362 at its upper end. Above the ridge the protrusion 350 is delimited by a vertical wall portion 364.

The tongue 352 and the groove 334 have a shape that allows to position the tongue 352 directly above the groove 334 by overlapping the protrusions 336 and 350 and to press the tongue 352 into the groove 334, so that the tongue 352 engages with the groove 334. Both the tongue 352 and the groove 334 are elastically deformable to be deformed during pressing the tongue 352 into the groove 334. During this pressing action the ridge 362 at the protrusion 350 can slide over the ridge 348 at the panel body 344 so that a tight connection between the two panel bodies 344 and 358 is formed. The strength of this connection is also provided by the elasticity of the tongue 352 and the groove 334 so that the tongue 352 can not simply be lifted out of the groove 334.

It is to be noted that, unlike the tongue and groove connection described with respect to the first tongue 304 and the first groove 302 at the longitudinal edges 300 and 306, the connection between the traverse edges 330 and 332 does not require any tilting of the two floor panels 50 to be connected during insertion of the second tongue 352 into the second groove 334. It is rather sufficient to place the second tongue 352 at the traverse edge 330 above the second groove 334 of the other traverse edge 332 and to push it down, as described above.

Laying a number of identical floor panels 50, as shown in FIG. 6, can be performed as follows. When one longitudinal row of floor panels 50 with their traverse edges 330,332 being connected together is completed and a second row is already started by connecting a first panel 50 of this second row with its longitudinal edge 306 to a free longitudinal edge 300 of the first row, each further panel 50 of the second row is laid down by positioning the first tongue 304 of its longitudinal edge 306 in the first groove 302 of the longitudinal edge 300 and laying it down, so that its traverse edge 330 carrying the second tongue 352 is pushed into the free second groove 334 of the traverse edge 332 of the floor panel 50 that has been laid down before. This means that identical floor panels 50 can be connected at their longitudinal edges 300,306 by tilting the new panel 50 and laying it down, while the connection at the traverse 330,332 need some pushing force from above to push the tongue 352 and the groove 334 elastically together.

The tongue and groove connections shown with respect to FIGS. 7 to 10 can be provided at all embodiments of floor panels 50,150,250 shown in the FIGS. 3, 4 and 5.

What is claimed is:
1. Floor panel in the form of a multilayer, rectangular elastic laminate, comprising:
  a main body including:
  a core of elastic plastic which deforms,
  a décor film on an upper side of the core,
  a transparent finishing layer on the décor film,
  a transparent lacquer layer, applied on the finishing layer,
  an elastic back-pull layer on a back of the core, and
  a lockable tongue and groove connection at least at two mutually opposite edges of the panel,
  wherein:

the core comprises at least one core layer and a reinforcement layer, the at least one core layer being made of a polyvinyl chloride (PVC) material, the reinforcement layer being a glass fibre mat that is impregnated with a polyvinyl chloride (PVC) material, the at least one core layer, the reinforcement layer, the Décor film, the transparent finishing layer and the back-pull layer being bonded to one another by calendering, the décor film on the upper side of the core is made of a polyvinyl chloride (PVC) material which is printed with a décor, the back-pull layer simultaneously acts as sound damping layer, said back-pull layer including sound dampening fillers therein, said sound dampening fillers being a material different from said back-pull layer, and the floor panel has a thickness of 4 to 8 mm.

2. The floor panel of claim 1, wherein the core comprises one core layer, and the reinforcement layer is disposed at a bottom side of the core layer.

3. The floor panel of claim 1, wherein the core comprises one core layer, and the reinforcement layer is disposed at a top side of the core layer.

4. The floor panel of claim 1, wherein the core comprises an upper core layer and a lower core layer, and the reinforcement layer is disposed between the upper core layer and the lower core layer.

5. Floor panel in the form of a multilayer, rectangular elastic laminate, comprising:
   a main body including:
   a core of elastic plastic,
   a décor film on an upper side of the core,
   a transparent finishing layer on the décor film,
   a transparent lacquer layer, applied on the finishing layer,
   an elastic back-pull layer on a back of the core, and
   wherein:
   the core comprises at least one core layer and a reinforcement layer,
   the at least one core layer being made of a polyvinyl chloride (PVC) material,
   the reinforcement layer being a glass fibre mat that is impregnated with a polyvinyl chloride (PVC) material,
   the at least one core layer and the reinforcement layer being bonded to one another by pressing,
   the décor film on the upper side of the core is made of a polyvinyl chloride (PVC) material which is printed with a décor,
   the back-pull layer simultaneously acts as a sound damping layer, said back-pull layer including sound dampening fillers therein, said sound dampening fillers being a material different from said back-pull layer, and
   the floor panel has a thickness of 4 to 8 mm, and
   a first groove that is disposed at a first longitudinal edge of the panel, the first groove being formed on top of a protrusion with a hook-like cross section extending from a lower portion of the first longitudinal edge of the panel,
   a first tongue that is disposed at a second longitudinal edge of the panel opposite to the first longitudinal edge, the first tongue being formed at a bottom of a protrusion extending from an upper portion of the second longitudinal edge of the panel,
   the first tongue having a cross section that is complementary to the first groove to be received by the first groove,
   a second groove that is disposed at a first traverse edge of the panel extending perpendicular to the first and second longitudinal edges, the first groove being formed on top of a protrusion with a hook-like cross section extending from a lower portion of the first traverse edge of the panel, and
   a second tongue that is disposed at a second traverse edge of the panel opposite to the first traverse edge, the second tongue being formed at a bottom of a protrusion extending from an upper portion of the second traverse edge of the panel,
   the second tongue being provided to be pressed into the second groove in a downward direction perpendicular to a surface plane of the panel,
   the second tongue and the second groove being elastically deformable to be deformed during pressing the second tongue into the second groove.

6. Method for manufacturing a floor panel in the form of a multilayer, rectangular elastic laminate, comprising the following steps:
   a) extruding at least one core layer of a polyvinyl chloride (PVC) material,
   b) extruding a décor film of a polyvinyl chloride (PVC) material,
   c) extruding a transparent finishing layer of a polyvinyl chloride (PVC) material,
   d) extruding a back-pull layer of a polyvinyl chloride (PVC) material including sound dampening fillers therein, said sound dampening fillers being a material different from said back-pull layer,
   e) printing the décor film with a décor,
   f) providing a glass fibre mat and impregnating this glass fibre mat with a polyvinyl chloride (PVC) material to form a reinforcement layer,
   g) applying the reinforcement layer to the at least one core layer to form a core, laminating the décor film and the transparent finishing layer onto a top side of the core and applying the back-pull layer at the a bottom side of the core to form a laminate,
   h) bonding the core, the décor film, the transparent finishing layer and the back-pull layer of the laminate resulting from step g) to one another by calendering,
   i) imprinting a haptic structure onto a surface of the transparent finishing layer by rolling, and
   j) applying a transparent lacquer layer on the transparent finishing layer.

7. Method of claim 6, wherein step g) comprises the step of forming of the core by applying the reinforcement layer to a bottom side of a core layer.

8. Method of claim 6, wherein step g) comprises the step of forming of the core by applying the reinforcement layer to a top side of a core layer.

9. Method of claim 6, wherein step a) comprises the step of extruding two core layers, and step g) comprises the step of forming of the core by sandwiching the reinforcement layer between these two core layers.

* * * * *